F. D. VANDERBILT.
FERTILIZER DISTRIBUTER.
APPLICATION FILED JULY 26, 1915.

1,300,791.

Patented Apr. 15, 1919.

WITNESSES:

INVENTOR
Farley D. Vanderbilt
BY
Parsons & Bodell
ATTORNEYS

UNITED STATES PATENT OFFICE.

FARLEY D. VANDERBILT, OF SENECA FALLS, NEW YORK, ASSIGNOR TO MARSEILLES COMPANY, OF MOLINE, ILLINOIS.

FERTILIZER-DISTRIBUTER.

1,300,791.   Specification of Letters Patent.   Patented Apr. 15, 1919.

Application filed July 26, 1915. Serial No. 41,835.

*To all whom it may concern:*

Be it known that I, FARLEY D. VANDERBILT, a citizen of the United States, residing at Seneca Falls, in the county of Seneca and State of New York, have invented a certain new and useful Fertilizer-Distributer, of which the following is a specification.

This invention relates to fertilizer distributers and has for its object a particularly simple and efficient means for yieldingly supporting the rake or comb; and the invention consists in the combinations and constructions hereinafter set forth and claimed.

In describing this invention, reference is had to the accompanying drawings, in which like characters designate corresponding parts in all the views.

Figure 1:
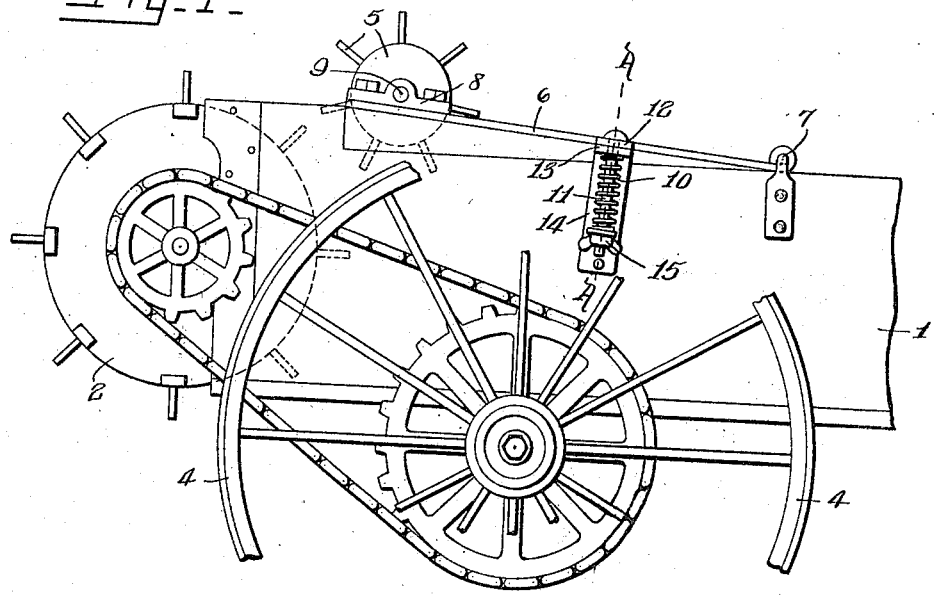
Figure 1 is a side elevation, partly broken away, of the rear end of a fertilizer distributer embodying my invention.
Figure 2:
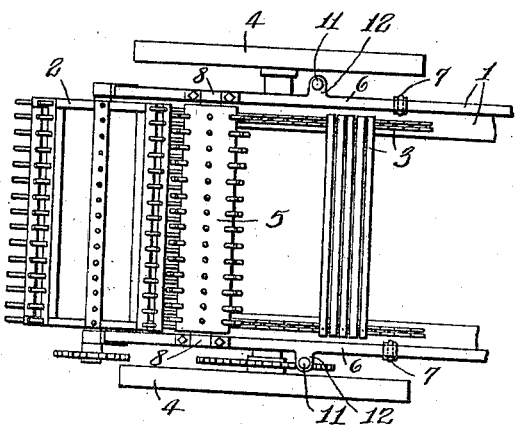
Fig. 2 is a plan of parts seen in Fig. 1.
Figure 3:
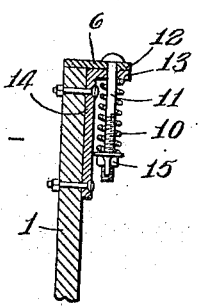
Fig. 3 is a section, partly in elevation, on line A—A, Fig. 1.

1 designates the body or box of the fertilizer distributer; 2, the beater, which is usually mounted at the rear end of the body or box and is revoluble for discharging the load; and 3, the conveyer or apron for carrying the load to the beater. The conveyer and the beater may be actuated from the rear axle or from the rear wheel 4 in any suitable manner.

5 is the rake which is here shown as a revoluble idler cylinder having radially extending teeth, and as located near, slightly above, and in front of, the upper front part of the beater. The rake is engaged by the upper underlying portion of the traveling load and is revolved thereby in a direction opposite to the direction of rotation of the beater. Said rake coacts most efficiently with the beater to break up the fertilizer, and to serve as an end-board.

6 are independently movable supports for supporting opposite ends of the rake 5, these supports being illustrated as resilient bars arranged at opposite sides of the body 1 and pivoted at 7 to the body at their ends remote from the rake 5, that is, at their front ends and carrying at their rear ends bearings 8 in which the axle 9 of the rake 5 is journaled. These spring bars are of the same general class as the rake or comb supports of my pending application, Sr. No. 15,576, renewed March 19, 1915, and permit the rake to move toward and from the beater in a path extending in a generally upright direction.

In the structure of my pending application, the resiliency for the rake lies solely in the rods or supports themselves, but in the structure of the present application, spring means are provided which are separable from the bars or supports and supplement the action of said bars in resisting movement of the rake or comb 5 from the beater, especially when clods pass between the beater and the rake. This spring means preferably includes independently movable coiled springs 10 extending in a generally upright direction at opposite sides of the body and acting to pull the supports 6 downwardly, the springs being illustrated as connected to the rods 6 between their ends. In this embodiment of my invention, each spring encircles a member, as a bolt 11, extending downwardly through, and movably engaging, a laterally extending lug 12 on each rod 6 and through an underlying shoulder or spring seat 13 formed on a bracket 14 fixed to the outer surface of the corresponding side of the box 1, the spring being interposed between the lug or shoulder 13 and an adjustable shoulder as a wing nut 15 threading on the lower end of the bolt 11. These wing nuts form a convenient means for adjusting the tension of the springs independently of each other.

In operation, the movement of the rake 5 from the beater is resisted by the spring bars 6 and also by the springs 10.

What I claim is:

1. In a fertilizer distributer, the combination of a body, a beater revoluble in one direction for discharging the load, a conveyer for carrying the load toward the beater, an idler rake located near the beater for engaging the upper portion of the load in advance of the contiguous part of the beater, said rake being revoluble in the opposite direction by the traveling load, movable means supporting the rake in position to yield in a substantially vertical direction toward and from the beater, and spring means interposed between the body and the supporting means to resist movement of the supporting means and the rake away from the beater, substantially as and for the purpose described.

2. In a fertilizer distributer, the combination of a body, a beater revoluble in one direction for discharging the load, a conveyer for carrying the load toward the beater, an idler rake located near the beater and engaging the upper portion of the load in advance of the contiguous part of the beater, said rake being movable in the opposite direction by the traveling load, supports at opposite sides of the body for supporting opposite ends of the rake, and springs at opposite sides of the body having parts thereof fixed relatively to the body and other parts movably connected to the supports to resist movement of the rake from the beater, substantially as and for the purpose set forth.

3. In a fertilizer distributer, the combination of a body, a beater revoluble in one direction for discharging the load, a conveyer for carrying the load toward the beater, an idler rake located near the beater and engaging the upper portion of the load in advance of the contiguous part of the beater, said rake being movable in the opposite direction by the traveling load, supports at opposite sides of the body for supporting opposite ends of the rake, the supports being movable with the rake in a path extending in a generally upright direction, spring seats on opposite sides of the body, and coiled springs at opposite sides of the body having corresponding ends coacting with said seats and their other ends connected to the supports to resist movement of the rake from the beater, substantially as and for the purpose specified.

4. In a fertilizer distributer, the combination of a body, a beater, a conveyer for carrying the load toward the beater, a rake arranged near the beater to coact therewith, supports constructed of yielding materials, the supports being pivoted to opposite sides of the body and extending rearwardly from the pivots, the supports carrying the rake at points remote from their pivots, and springs connected to the body and to the supports, between the pivots of the supports and the rake and serving to supplement the yielding action of the spring supports, substantially as and for the purpose set forth.

In testimony whereof, I have hereunto signed my name at Clyde, in the county of Wayne and State of New York, this 17 day of July, 1915.

FARLEY D. VANDERBILT

Copies of this patent may be obtained for five cents each, by addressing the "Commissioner of Patents, Washington, D. C."